(12) United States Patent
Cavelius et al.

(10) Patent No.: US 10,703,562 B2
(45) Date of Patent: Jul. 7, 2020

(54) STORAGE AND RETRIEVAL UNIT

(71) Applicant: Jungheinrich Aktiengesellschaft, Hamburg (DE)

(72) Inventors: Joerg Cavelius, Bad Vilbel (DE); Elmar Harting, Offenbach/Main (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 263 days.

(21) Appl. No.: 15/842,214

(22) Filed: Dec. 14, 2017

(65) Prior Publication Data
US 2018/0170671 A1 Jun. 21, 2018

(30) Foreign Application Priority Data
Dec. 15, 2016 (DE) .................. 10 2016 124 450

(51) Int. Cl.
*B65G 1/02* (2006.01)
*B66F 9/07* (2006.01)
*B66F 9/075* (2006.01)

(52) U.S. Cl.
CPC ............. *B65G 1/026* (2013.01); *B65G 1/023* (2013.01); *B66F 9/072* (2013.01); *B66F 9/0755* (2013.01); *B66F 9/07586* (2013.01)

(58) Field of Classification Search
CPC .......... E01B 25/00; E01B 25/08; E01B 25/22; E01B 25/24; B65G 1/00; B65G 1/026
See application file for complete search history.

(56) References Cited

U.S. PATENT DOCUMENTS 4,794,865 A * 1/1989 Lindberg ................. A63G 7/00
                                                    104/109
6,220,173 B1 * 4/2001 Sauerwein ............ B61L 23/002
                                                    104/106

* cited by examiner

*Primary Examiner* — Robert J McCarry, Jr.
(74) *Attorney, Agent, or Firm* — Greenblum & Bernstein, P.L.C.

(57) ABSTRACT

Storage and retrieval unit that includes a rail arrangement having a track and a flange arrangement. In a direction of gravity, the track is located below the flange arrangement. The storage and retrieval unit further includes a moving gear comprising a track roller arrangement and an array of underfriction wheels. The track roller arrangement is configured to support the moving gear on the track, and the array of underfriction wheels is arranged to engage under the flange arrangement.

22 Claims, 2 Drawing Sheets

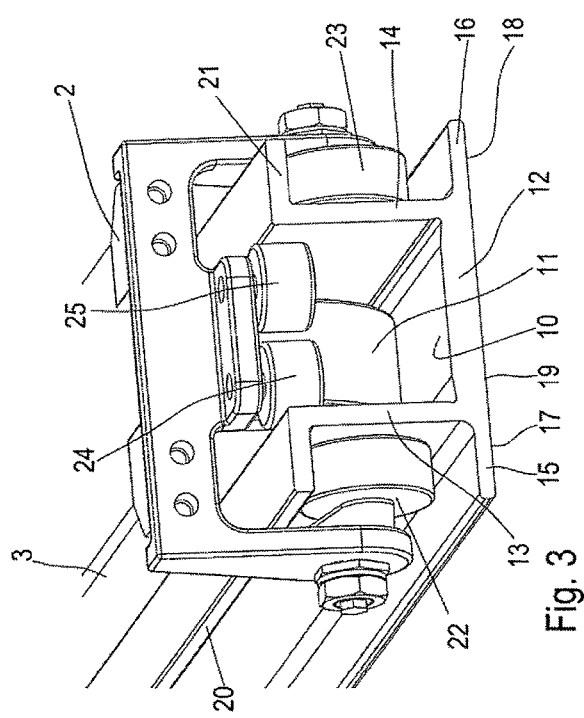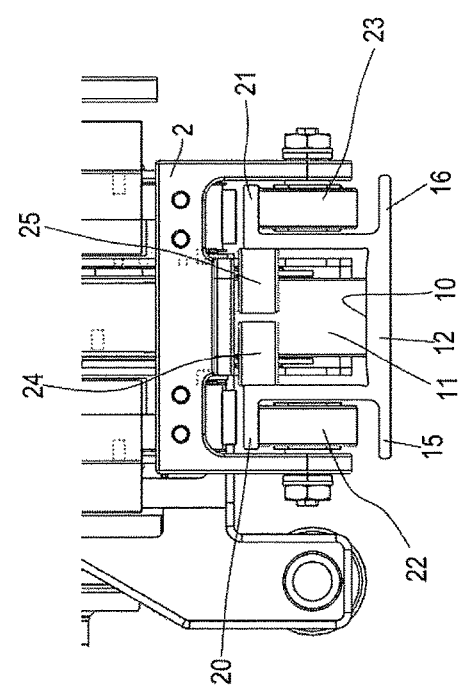

STORAGE AND RETRIEVAL UNIT

CROSS-REFERENCE TO RELATED APPLICATIONS

The present application claims priority under 35 U.S.C. § 119 of German Patent Application No. 10 2016 124 450.3, filed Dec. 15, 2016, the disclosure of which is expressly incorporated by reference herein in its entirety.

BACKGROUND

1. Field of the Invention

The invention relates to a storage and retrieval unit with a moving gear that is supported by a track roller arrangement on a track of a rail arrangement and, with an array of underfriction wheels, engages under a flange arrangement of the rail arrangement.

2. Discussion of Background Information

A storage and retrieval unit is typically used to put product units into storage in a rack or to retrieve product units from a rack. In many cases, a possibility of movement by the storage and retrieval unit in three spatial coordinates is necessary therefor. The movement in one of these spatial coordinates occurs along the rail arrangement, in that the moving gear travels along the track of the rail arrangement via the track roller arrangement of the moving gear. The rail arrangement is thereby expediently positioned in a rack aisle of a rack. On the moving gear, a mast is in many cases arranged on which a lift truck can be moved up and down. This is then a movement in a second spatial coordinate. On the lift truck, a load suspension device is then arranged in many cases, which device allows a movement in the third spatial coordinate.

Typically, steel girders are used as rail arrangements for storage and retrieval units. These steel girders have an I- or double T-profile with two parallel flanges that are connected to one another by a connecting crosspiece. The connecting crosspiece is positioned upright during proper installation. One flange rests on the ground and the other flange serves with its top side as a track and with its bottom side as a support track for the underfriction (or underpinning) wheels.

SUMMARY

Embodiments of the invention enable the efficiently use existing installation space as storage spaces in a rack.

According to embodiments, a storage and retrieval unit of the type named at the outset includes a track that is arranged below the flange arrangement in the direction of gravity.

With a design of this type, it is possible to arrange the track lower than in known arrangements, without having to sacrifice the functionality of the underfriction (or underpinning) wheels. The lower the track is arranged, the further downwards the storage and retrieval unit can be moved in the direction of gravity, that is, in a direction towards the floor, while also reaching shelf spaces in the rack in this location.

Here, it is preferred that the track is arranged at the bottom of a U-shaped recess in the rail arrangement. The moving gear can thus in any case be partially inset in the rail arrangement. The center of gravity of the moving gear can thus be arranged to be relatively low.

Preferably, the bottom forms the top side of a base plate that rests on a bed of the rail arrangement. Thus, essentially only the base plate is located between the bed of the rail arrangement and the track roller arrangement. The track roller arrangement is thus only separated from the bed by the thickness of the base plate, as a result of which the storage and retrieval unit can also reach relatively low-lying regions of the rack. Compared to conventional rail arrangements, as has been described above, the track can be arranged 100 mm to 200 mm lower.

Preferably, the rail arrangement comprises lateral support flanges, the bottom side of which is flush with the bottom side of the base plate. The rail arrangement is thus braced against a tilting torque.

Preferably, the base plate has a greater thickness than the support flanges. In this manner, the fact that the base plate must absorb the weight forces of the moving part of the storage and retrieval unit, and any loads transported thereby, is accounted for.

Preferably, the moving gear comprises guide rollers that bear against the side walls of the U-shaped recess. The moving gear is thus laterally guided, so that the track roller arrangement is always reliably held on the track. The guide rollers are also positioned in the rail arrangement, so that only a small width is necessary here.

Preferably, the rail arrangement is embodied as an extrusion profile, in particular as an aluminum extrusion profile. An extrusion profile can be produced with high precision. In terms of production technology, aluminum extrusion profiles have suitable tolerances, in particular with regard to straightness and torsion. A costly straightening of profiles of this type for producing the rail arrangement can be omitted.

Preferably, the rail arrangement is formed from multiple sections that are set end-to-end against one another. Because of the low tolerance, it is not necessary to connect the individual sections to one another at the joints. It is sufficient if they are laid end-to-end against one another. This results in significant cost savings.

In a preferred embodiment, the moving gear is connected to a drive belt arrangement, and the flange arrangement forms with the top side thereof a contact surface for the drive belt arrangement. Here, the drive belt arrangement is stationary and the moving gear comprises one or more powered drive wheels that are engaged with the drive belt arrangement. The moving gear then pulls itself along the drive belt arrangement autonomously, as it were. Because the track is decoupled from the top side of the flange arrangement, this top side can now be used to store the sections of the drive belt arrangement that are not currently engaged with the drive wheel or drive wheels. Damage to the drive belt arrangement can thus be avoided.

Here, it is preferred that at least one end of the drive belt arrangement is connected to the rail arrangement. As a result, no separate attachment point, for example a permanent anchoring on the ground, is necessary.

Embodiments of the invention are directed to a storage and retrieval unit that includes a rail arrangement having a track and a flange arrangement. In a direction of gravity, the track is located below the flange arrangement. The storage and retrieval unit further includes a moving gear comprising a track roller arrangement and an array of underfriction wheels. The track roller arrangement is configured to support the moving gear on the track, and the array of underfriction wheels is arranged to engage under the flange arrangement.

According to embodiments, the rail arrangement can further include a U-shaped recess and the track can be arranged at a bottom of the U-shaped recess. Further, the bottom can form a top side of a base plate that rests on a bed of the rail arrangement. The rail arrangement may further include lateral support flanges, and bottom sides of the lateral support flanges may be flush with a bottom side of the base plate. The base plate can have a greater thickness than that of the lateral support flanges.

In embodiments, the moving gear can include guide rollers arranged to bear against side walls of the U-shaped recess.

In accordance with other embodiments, the rail arrangement can be embodied as an extrusion profile. Moreover, the extrusion profile can include an aluminum extrusion profile.

According to other embodiments, the rail arrangement may include multiple sections set end-to-end against one another.

In still other embodiments, the storage and retrieval unit may also include a drive belt arrangement. The moving gear can be connected to the drive belt arrangement, and a top surface of the flange arrangement may form a contact surface for the drive belt arrangement. At least one end of the drive belt arrangement can be connected to the rail arrangement.

Moreover, embodiments are directed to a method of forming the above-described storage and retrieval unit. The method includes positioning the track roller arrangement to support the moving gear on the track of the rail arrangement; and arranging the array of underfriction wheels to engage under the flange arrangement of the rail arrangement.

Embodiments of the invention are directed to a method of forming a storage and retrieval unit. The method includes forming a rail arrangement having flange arrangement and a track located below, with respect to a direction of gravity, the flange arrangement; positioning a track roller arrangement to support a moving gear on a track of the rail arrangement; and arranging an array of underfriction wheels to engage under a flange arrangement of the rail arrangement.

According to embodiments, the method can also include assembling the rail arrangement by arranging multiple sections end to end. The multiple sections may include extruded aluminum profiles or the multiple sections may include profiles of milled, drawn or rolled steel.

Embodiments of the invention are directed to a storage and retrieval unit that includes a rail arrangement comprising a track; a track roller arrangement movable along the track; a moving gear supported by the track roller arrangement; the rail arrangement comprising a flange arrangement; and an array of underfriction wheels arranged to engage under the flange arrangement. In a direction of gravity, the track is arranged below the flange arrangement.

In accordance with still yet other embodiments of the present invention, the storage and retrieval unit can also include guide rollers arranged to bear against a part of the rail arrangement. Further, the track roller arrangement, the array of underfriction wheels and the guide rollers can be coupled to the moving gear. Moreover, the rail arrangement can be configured with a U-shaped recess having a bottom surface on which the track is located, the flange arrangement may be located on an open end of the U-shaped channel, the track roller arrangement and the guide rollers can be located within the U-shaped recess, and the array of underfriction wheels may be located outside of the U-shaped channel to contact an underside of the flange arrangement.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3 shows a rail arrangement with parts of the moving gear; and

FIG. 4 shows a front view of a section of the storage and retrieval unit.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A storage and retrieval unit 1 comprises a moving gear 2 which is movable along a rail arrangement 3. The rail arrangement 3, which is described in greater detail in connection with FIGS. 3 and 4, is positioned in a rack aisle so that the moving gear 2 can be moved in the rack aisle.

Figure 1:
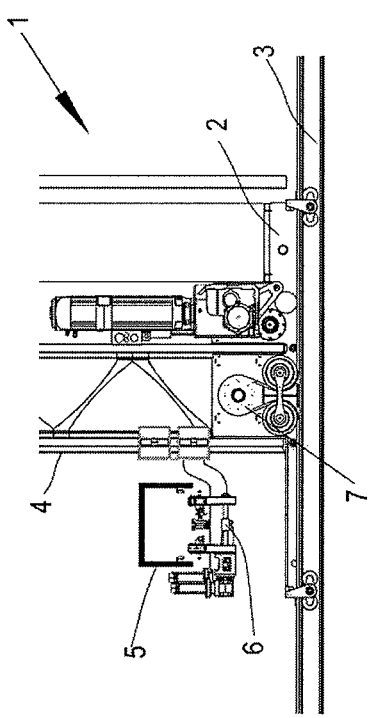
FIG. 1 shows a side view of a storage and retrieval unit.

On the moving gear 2, a mast 4 is mounted on which a schematically illustrated lift truck 5 can be moved up and down. On the lift truck 5, load suspension devices 6 are arranged which can be moved perpendicular to the extension of the rail arrangement 3 and perpendicular to the extension of the mast 4. In reference to the illustration in FIG. 1, this is a movement perpendicular to the drawing plane.

The load suspension devices 6 can thus be moved in three spatial coordinates in order to reach virtually every region of a rack and to pick up or put down a product unit therein, for example, a package or a container.

Figure 2:
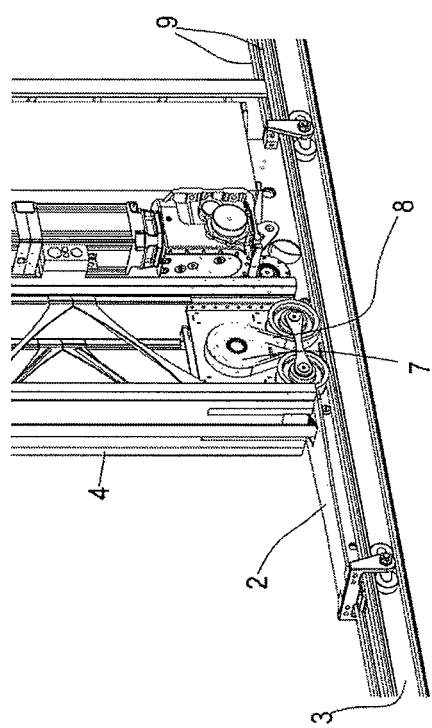
FIG. 2 shows a perspective illustration of part of the storage and retrieval unit.

As can be seen from FIG. 2, the moving gear comprises a drive that is embodied as what is referred to as an Ω drive. The drive comprises on both sides of the moving gear one drive wheel 7 each, which is provided on the outer circumference thereof with a toothing that is engaged with a corresponding toothing of a drive belt 8. Accordingly, two drive belts 8 are also provided on both sides of the moving gear 2. Together, the two drive belts form a drive belt arrangement 9. The drive belt arrangement is attached to the rail arrangement 3, preferably in the region of the ends thereof. If the drive wheels 7 rotate, then the moving gear 2 pulls itself along the rail arrangement 3.

The rail arrangement 3 comprises a track 10 on which the moving gear 2 is supported by a track roller arrangement 11. The track 10 is arranged at the bottom of a U-shaped recess in the rail arrangement 3. The track 10 is thereby arranged on the top side of a base plate 12 that rests on a bed of the rail arrangement 3. This bed can be a floor, for example. It is also possible to additionally place leveling elements between the floor and the rail arrangement 3.

The rail arrangement 3 comprises side walls 13, 14 on both sides of the base plate 12. Together with the base plate 12, the side walls 13, 14 form the aforementioned U-shaped recess. Furthermore, the rail arrangement 3 comprises lateral support flanges 15, 16, the bottom side 17, 18 of which is flush with the bottom side 19 of the base plate 12. The base plate 12 thus continues laterally into the support flanges 15, 16, but has a greater thickness than the support flanges 15, 16.

At the upper end of the side walls 13, 14, that is, at the end facing away from the base plate 12, flanges 20, 21 are arranged which extend essentially parallel to the support flanges 15, 16, so that the support flange 15 forms a U-shaped profile with the side wall 13 and the flange 20 and the support flange 16 likewise forms a U-shaped profile with the side wall 14 and the flange 21.

The flanges 20, 21 form a flange arrangement. The moving gear 2 comprises underfriction (or underpinning) wheels 22, 23 that engage under the flanges 20, 21 and thus under the flange arrangement. On the bottom side of the flanges 20, 21, a raceway for the underfriction wheels 22, 23 is thus arranged, as it were.

Furthermore, the moving gear 2 comprises guide rollers 24, 25 which bear against the side walls 13, 14 from the inside, that is, from the side of the track 10.

FIGS. 3 and 4 show an arrangement at one end of the moving gear 2. At the other end of the moving gear 2, another arrangement of this type is provided.

Because the track 10 is lowered below the flanges 20, 21 and roughly all the way to the floor, the moving gear 2 can also be arranged to be relatively low. The result is a low center of gravity of the moving gear 2, which in turn has a favorable effect on the tendency to overturn. The guide rollers 24, 25 can engage on a region of the side walls 13, 14 which lies above an axis of rotation of the track roller arrangement 11 in the direction of gravity.

Because the track 10 is arranged on the top side of the base plate 12, the top side of the flanges 20, 21 is clear and can, as can be seen in FIG. 2, be used for storage of the drive belts 8, more precisely, of the part of the drive belts 8 that is not engaged with the drive wheel 7.

The rail arrangement 3 is embodied as an aluminum extrusion profile. In terms of production technology, aluminum extrusion profiles have suitable tolerances, in particular with regard to straightness and torsion. For this reason, it is possible to combine multiple sections of the rail arrangement 3 into a longer rail arrangement 3 by setting the individual sections against one another end-to-end. A welding or other type of connection is not necessary. This results in significant cost savings for production. Additionally, no corrosion problems occur in warm, humid storage facilities.

As an alternative to the production of the rail arrangement 3 by extruding aluminum, other production methods can also be used. For example, a profile of milled, drawn or rolled steel, or steel formed in another manner, or of another metal can be used.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A storage and retrieval unit, comprising:
    a rail arrangement comprising a track and a flange arrangement, wherein, in a direction of gravity, the track is located below the flange arrangement;
    a moving gear comprising a track roller arrangement and an array of underpinning wheels,
    wherein the track roller arrangement is configured to support the moving gear on the track, and
    wherein the array of underpinning wheels engages under a bottom side of the flange arrangement.

2. The storage and retrieval unit according to claim 1, the rail arrangement further comprising a U-shaped recess, wherein the track is arranged at a bottom of the U-shaped recess.

3. The storage and retrieval unit according to claim 2, wherein the bottom forms a top side of a base plate that rests on a bed of the rail arrangement.

4. The storage and retrieval unit according to claim 3, wherein the rail arrangement further comprises lateral support flanges, and wherein bottom sides of the lateral support flanges are flush with a bottom side of the base plate.

5. The storage and retrieval unit according to claim 4, wherein the base plate has a greater thickness than that of the lateral support flanges.

6. The storage and retrieval unit according to claim 2, wherein the moving gear comprises guide rollers arranged to bear against side walls of the U-shaped recess.

7. The storage and retrieval unit according claim 1, wherein the rail arrangement is embodied as an extrusion profile.

8. The storage and retrieval unit according to claim 7, wherein the extrusion profile comprises an aluminum extrusion profile.

9. The storage and retrieval unit according to claim 1, wherein the rail arrangement comprises multiple sections set end-to-end against one another.

10. The storage and retrieval unit according to claim 1, further comprising a drive belt arrangement, wherein the moving gear is connected to the drive belt arrangement, and wherein a top surface of the flange arrangement forms a contact surface for the drive belt arrangement.

11. The storage and retrieval unit according to claim 10, wherein at least one end of the drive belt arrangement is connected to the rail arrangement.

12. A method of forming the storage and retrieval unit according to claim 1, comprising:
    positioning the track roller arrangement to support the moving gear on the track of the rail arrangement; and
    arranging the array of underpinning wheels to engage under the flange arrangement of the rail arrangement.

13. A method of forming a storage and retrieval unit, comprising:
    forming a rail arrangement having flange arrangement and a track located below, with respect to a direction of gravity, the flange arrangement;
    positioning a track roller arrangement to support a moving gear on a track of the rail arrangement; and
    arranging an array of underpinning wheels to engage a bottom side of a flange arrangement of the rail arrangement facing the track.

14. The method according to claim 13, further comprising assembling the rail arrangement by arranging multiple sections end to end.

15. The method according to claim 14, wherein the multiple sections comprise extruded aluminum profiles.

16. The method according to claim 14, wherein the multiple sections comprise profiles of milled, drawn or rolled steel.

17. A storage and retrieval unit, comprising:
a rail arrangement comprising a track;
a track roller arrangement movable along the track;
a moving gear supported by the track roller arrangement;
the rail arrangement comprising a flange arrangement; and
an array of underpinning wheels arranged to engage a bottom side of the flange arrangement facing the track,
wherein, in a direction of gravity, the track is arranged below the flange arrangement.

18. The storage and retrieval unit according to claim 17, further comprising guide rollers arranged to bear against a part of the rail arrangement.

19. The storage and retrieval unit according to claim 18, wherein the track roller arrangement, the array of underpinning wheels and the guide rollers are coupled to the moving gear.

20. The storage and retrieval unit according to claim 19, wherein the rail arrangement is configured with a U-shaped recess having a bottom surface on which the track is located,
wherein the flange arrangement is located on an open end of the U-shaped channel,
wherein the track roller arrangement and the guide rollers are located within the U-shaped recess, and
wherein the array of underpinning wheels are located outside of the U-shaped channel to contact an underside of the flange arrangement.

21. The storage and retrieval unit according to claim 1, wherein the array of underpinning wheels engage a raceway on a bottom side of the flange arrangement facing the track.

22. A storage and retrieval unit, comprising:
a rail arrangement comprising a track, a flange arrangement and a U-shaped recess having side walls, wherein, in a direction of gravity, the track is arranged at a bottom of the U-shaped recess, which is located below the flange arrangement;
a moving gear comprising a track roller arrangement, an array of underpinning wheels and guide rollers arranged to bear against the side walls of the U-shaped recess,
wherein the track roller arrangement is configured to support the moving gear on the track,
wherein the array of underpinning wheels is arranged to engage under the flange arrangement,
wherein the bottom of the U-shaped recess forms a top side of a base plate resting on a bed of the rail arrangement, and
the rail arrangement further comprises lateral support flanges having bottom sides that are flush with a bottom side of the base plate.

* * * * *